W. BLAKE.
Measuring Device for Seed-Bag Fillers.
No. 198,532. Patented Dec. 25, 1877.
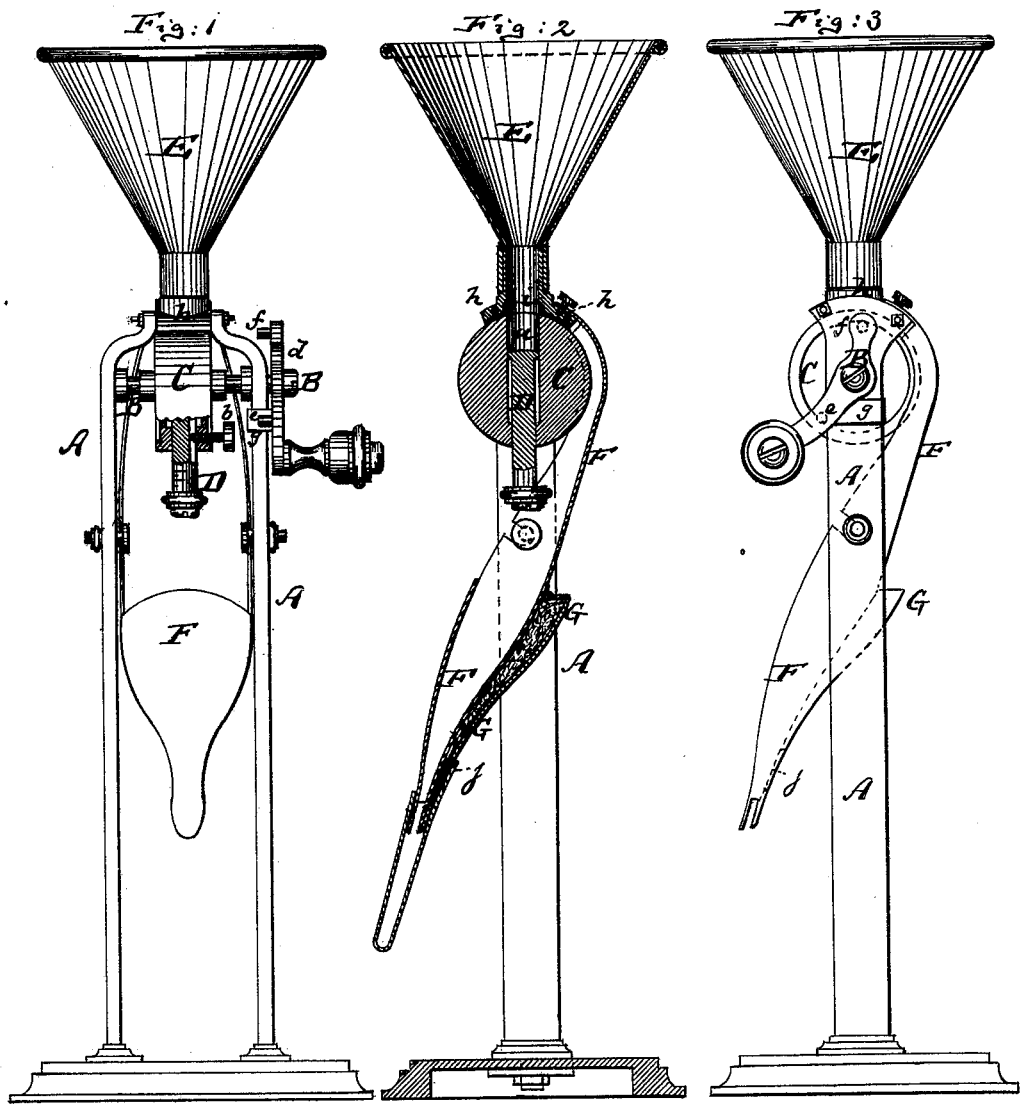
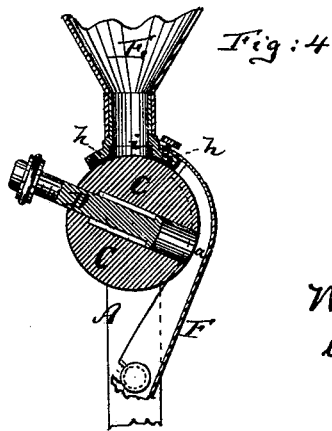
Witnesses:
D. V. Briesen
John C. Tunbridge
Inventor:
Wm. Blake
by his attorney
A. v. Briesen

UNITED STATES PATENT OFFICE.

WILLIAM BLAKE, OF LIVERPOOL, ENGLAND, ASSIGNOR TO VICTOR E. MAUGER, OF NEW YORK, N. Y.

IMPROVEMENT IN MEASURING DEVICES FOR SEED-BAG FILLERS.

Specification forming part of Letters Patent No. 198,532, dated December 25, 1877; application filed November 30, 1877.

*To all whom it may concern:*

Be it known that I, WILLIAM BLAKE, of Liverpool, England, have invented a new and Improved Apparatus for Filling Seed-Bags, of which the following is a specification:

Figure 1 is a front elevation, partly in section, of my improved apparatus for filling seed-bags. Fig. 2 is a vertical transverse section of the same; Fig. 3, a side elevation of same; Fig. 4, a detail vertical transverse section of the discharge-drum and adjustable follower.

Similar letters of reference indicate corresponding parts in all the figures.

This invention has for its object to produce a machine for accurately distributing seed or other analogous substance to and for filling, in rapid succession, numbers of seed-bags or similar receptacles, so that, from the contents of a hopper or supply-reservoir, each of the series of bags will receive the exact quantity of seed desired.

The invention consists in the new arrangement of discharge-drum, having adjustable follower, and of other details of improvement, hereinafter more clearly pointed out.

The letter A in the drawing represents the frame of the machine, in which is hung a horizontal shaft, B, carrying a cylindrical drum, C. This drum has a channel, $a$, bored through it, and receives within said channel a movable plug or follower, D. Said follower can be firmly clamped in any position within the drum by a set-screw, $b$, which passes through the side of the drum into a groove formed at one side of the follower, as clearly indicated in Fig. 1. The shaft B has a handle, $d$, by means of which it may be oscillated, said handle having two projecting stop-pins, $e$ and $f$, which limit its motion in the desired manner, and thereby, also, the motion of the shaft and drum. Said stop-pins, at the limits of movement, strike a cushion, $g$, which is applied to the frame A, as indicated. The cushion may be of rubber or equivalent material, and serves to make the operation of the machine noiseless.

When the stop $e$ strikes the cushion, as in Fig. 1, the upper end of the channel $a$ will be above the shaft B, and in communication with a hopper, E, which is supported on top of the frame A, as in Fig. 2. When, however, the stop $f$ strikes the cushion, the end of the channel $a$ which communicated with the hopper will be inclined downward, as in Fig. 4, to discharge its contents into a spout, F, which is carried by the frame A.

Instead of two stop-pins, $e f$, one will suffice; but in that case two cushions or an elongated cushion will be used.

The lower part of the hopper connects with a curved yoke, $h$, which is carried by the frame A, and covers the top of the drum C. This yoke is hollow, to allow the hopper to communicate with the channel $a$. Within the hollow of the yoke $h$ is placed a rubber ring, $i$, which reaches to the drum C, and embraces the mouth of the channel $a$, acting as a wiper during the motion of the drum.

The seed to be distributed is placed into the hopper, and the follower is thereupon so adjusted within the drum as to leave the upper inclosed part of the channel $a$ of a size to receive a discharge of the desired extent.

The lower part of the follower is graduated, as shown in Fig. 1, to enable the operator to adjust it with nicety. After the hopper has been supplied with seed, the drum is brought into the position shown in Fig. 2, so that it will receive a charge of seed within its channel $a$. An envelope or seed-bag is then placed over the contracted lower end of the spout F, and the handle then moved to bring the drum into the position shown in Fig. 4. The contents of the drum are, in this position, discharged into the spout F, and flow thence into the envelope. The drum is then turned back into the position shown in Fig. 2, to be recharged, a new envelope applied to the spout, the charge emptied into the same, &c. Thus all the charges will be alike, and the envelopes will be quickly filled.

When envelopes having gummed flaps are used, the moistening of the flaps is performed by a soaked pad, $j$, which is placed against the back of the spout F, close to the discharge end of the latter. For the reception of this pad a box, G, is placed against the back of the spout, and filled with sponge or other absorbing material, which extends to the pad $j$, and, when charged with moisture, serves to soak said pad. The envelope-flap is held against the pad $j$ while the envelope is being charged, and the gum being thus dissolved, the operator has only to bend the flap over the mouth of the envelope, thereby permanently closing it.

I claim as my invention—

1. The combination of the hopper E with the drum C, having channel $a$, and adjustable follower D, and with the spout F, to operate substantially as herein shown and described.

2. The hollow yoke $h$, carrying the annular wiper $i$, and combined with the drum C, having channel $a$, substantially as herein shown and described.

3. The combination of the hopper E, drum C, follower D, and shaft B with the handle $d$, stop $e$, and cushion $g$, substantially as herein shown and described.

4. The combination of the drum C, having channel $a$, with the grooved follower D and set-screw $b$, substantially as and for the purpose herein shown and described.

5. The discharge-spout F, combined with the soaking-pad $j$, for moistening the gum on an envelope, substantially as herein shown and described.

WM. BLAKE.

Witnesses:
  W. HUGHES,
  ROBT. FAWCETT.